Aug. 28, 1923.
R. J. WENSLEY
1,466,260
ELECTRICAL PROTECTIVE DEVICE
Filed April 4, 1918
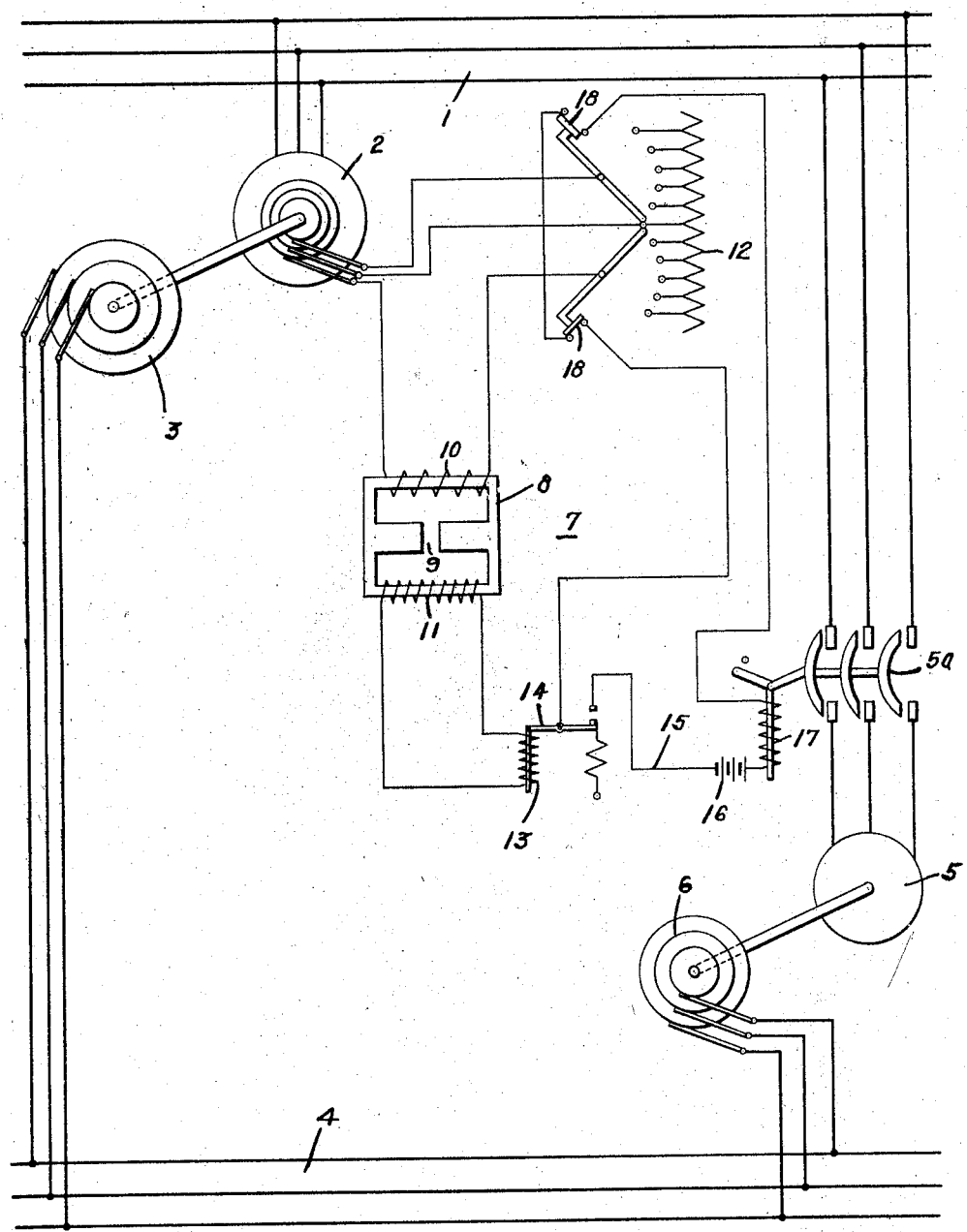
WITNESSES:
Ed. V. Herron
J. H. Procter
INVENTOR
Roy J. Wensley
BY
Wesley E. Barr
ATTORNEY Patented Aug. 28, 1923.

1,466,260

UNITED STATES PATENT OFFICE.

ROY J. WENSLEY, OF EDGEWOOD PARK, PENNSYLVANIA, ASSIGNOR TO WESTINGHOUSE ELECTRIC & MANUFACTURING COMPANY, A CORPORATION OF PENNSYLVANIA.

ELECTRICAL PROTECTIVE DEVICE.

Application filed April 4, 1918. Serial No. 226,619.

*To all whom it may concern:*

Be it known that I, ROY J. WENSLEY, a citizen of the United States, and a resident of Edgewood Park, in the county of Allegheny and State of Pennsylvania, have invented a new and useful Improvement in Electrical Protective Devices, of which the following is a specification.

My invention relates to electrical protective devices and particularly to frequency responsive relays for use in connection with induction motors.

One object of my invention is to provide a relay that shall be responsive to the slip and, consequently, the frequency of the current traversing the rotor winding of an induction motor.

Another object of my invention is to provide a frequency-responsive relay of the above-indicated character that shall be relatively simple and inexpensive to construct and effective in its operation.

In practicing my invention, I provide a magnetizable core member having a leakage path between the primary and the secondary windings thereof. The core member is of such characteristics that it is normally magnetically saturated. By this construction, the voltage induced in the secondary winding will be independent of the voltage of the primary winding above a predetermined value and will vary in accordance with the frequency of the current traversing the primary winding. If the primary winding is connected to the rotor winding of an induction motor, a relay that is connected to the secondary winding may be caused to be responsive to the slip and, consequently, the load on the motor.

The single figure of the accompanying drawing is a diagrammatic view of an electrical system embodying my invention.

An electric circuit 1 is operatively connected to the primary or stator winding of an induction motor 2 that is adapted to drive a generator 3 for the purpose of supplying energy to an electric circuit 4. A second motor-generator set, comprising an induction motor 5 and a generator 6, is adapted to be connected between the circuits 1 and 4 for the purpose of assisting the motor 2 and the generator 3 when the same become loaded to a predetermined degree.

Since the speed and, consequently, the slip of the rotor of the motor 2 varies in accordance with the load on the same, and, since the frequency of the current traversing the rotor winding of the motor 2 varies in accordance with the load, I provide a relay device 7 that is responsive to the frequency and, consequently, the slip or load on the motor 2 for controlling the operation of the interrupter 5ª for the circuit of the motor 5.

The relay device 7 comprises a magnetizable core member 8 having a leakage path 9 between the legs thereof and primary and secondary windings 10 and 11 thereon. The primary winding 10 is connected in circuit with the rotor winding of the motor 2 and its controlling resistors 12, and the secondary winding 11 is connected to the winding 13 of a voltage-responsive relay 14. The relay 14 is adapted to control a circuit 15 that comprises a source 16 of electromotive force, the actuating winding 17 of the circuit interrupter 5ª and contact members 18 that are normally in their closed positions when the controlling resistor 12 of the motor 2 is short circuited.

The magnetizable core member 8 of the relay device 7 is of such construction that it is adapted to become magnetically saturated for relatively small values of current traversing the winding 10 and the rotor winding of the motor 2, and, since the core member 8 is provided with a leakage path 9, only a predetermined voltage will be induced in the winding 11, irrespective of the current traversing the winding 10 above a predetermined value. However, when the speed of the motor 2 changes, by reason of the increased load thereon, the frequency of the current traversing the rotor winding and the winding 10 will be proportional to the speed of the motor 2 and, consequently, the load thereon. Thus, the change in the voltage impressed on the winding 11 will vary in accordance with the frequency only and, consequently, the slip or load on the motor 2. When the load on the motor 2 has a predetermined value, sufficient voltage will be induced in the winding 11 to cause the relay 14 to operate and when the relay 14 operates, the circuit 15 will be completed to close the interrupter 5ª. When the interrupter 5ª is actuated, the motor 5 operates the generator 6 to assist the generator 3 in supplying energy to the circuit 4.

My invention is not limited to the specific application illustrated, as it may be applied to other devices and may be variously modified without departing from the spirit and scope of the invention, as set forth in the appended claims.

I claim as my invention:

1. In an electrical system, the combination with an induction motor having a wound rotor, of a magnetizable core member, a primary winding for the core member connected to the rotor winding of the motor, a secondary winding for the core member, and an electro-responsive device connected to the secondary winding, said core member being of such characteristics that it becomes so magnetically saturated at relatively low values of current that the potential induced in the secondary winding is proportional to the slip of the rotor.

2. In an electrical system, the combination with an induction motor having a wound rotor, of a magnetizable core member, a primary winding for the core member connected to the rotor winding of the motor, a secondary winding for the core member, and an electro-responsive device connected to the secondary winding, said core member being of such characteristics that it becomes so magnetically saturated at relatively low values of current that the potential induced in the secondary winding is proportional to the frequency of the current traversing the rotor.

3. In an electrical system, the combination with an induction motor having a wound rotor, of a magnetizable core member, a primary winding therefor connected to the rotor winding and a secondary winding for the core member, said core member being of such characteristics that it becomes so magnetically saturated, at relatively low values of current traversing its primary winding, that the electromotive force induced in the secondary winding is proportional to the frequency generated by the rotor winding, and means responsive to the induced electromotive force.

4. In an electrical system, the combination with an induction motor having a wound rotor, of a magnetizable core member, a primary winding therefor connected to the rotor winding and a secondary winding for the core member, said core member being of such characteristics that it becomes so magnetically saturated, at relatively low values of current traversing its primary winding, that the electromotive force induced in the secondary winding is proportional to the slip of the rotor, and means responsive to the induced electromotive force.

5. The combination with an induction motor having a wound rotor, of a normally saturated core member, a primary winding therefor connected to the rotor winding, and a secondary winding adapted to have electromotive forces induced therein in accordance with the slip of the rotor, and means responsive to the induced electromotive forces.

6. The combination with an induction motor having a wound rotor, of a magnetizable core member, a primary winding therefor connected to the rotor winding, and a secondary winding, said core member being of such characteristic that it is normally saturated to thereby cause the electromotive forces induced in the secondary winding to be proportional only to the slip of the rotor, and means responsive to the induced electromotive forces.

7. The combination with an induction motor having a wound rotor, of a relay, and a normally saturated transformer disposed between the rotor winding and the relay, the characteristics of the transformer being such that the relay is actuated only in accordance with the slip of the rotor.

8. The combination with an induction motor having a wound rotor, of a relay, and a transformer disposed between the rotor winding and the relay and having such flux-controlling characteristics that the relay is actuated only in accordance with the slip of the rotor.

9. The combination with an induction motor having a wound rotor, of an electro-responsive device, and a transformer connected between the rotor winding and the said device and having such voltage transforming characteristics that the said device is supplied with current only in accordance with the slip of the rotor.

10. The combination with an induction motor having a wound rotor, of a normally saturated core member, a primary winding therefor connected to the rotor winding, a secondary winding adapted to have voltages induced therein in accordance with the slip of the rotor, and means responsive to that voltage.

11. The combination with a wound-rotor induction motor, of means for producing an electromotive force varying with the slip of the motor comprising a normally saturated magnetizable core member, a primary winding therefor energized from the rotor winding and a secondary winding energized by the primary winding to produce an electromotive force varying with the slip of the motor.

12. The combination with an electric apparatus provided with a winding movable relative to a moving magnetic flux, of means for indicating the relative movement therebetween by generating an electromotive force varying with such relative movement which comprises a primary winding energized from the movable winding, a secondary winding energized from the primary winding, a normally saturable core member between the primary and the secondary winding for controlling the electromotive force induced in the secondary winding to render such force responsive to the frequency of reversal of flux in said core member by the current traversing the primary winding and independent of changes in the voltage impressed upon the primary winding.

In testimony whereof, I have hereunto subscribed my name this 25th day of March 1918.

ROY J. WENSLEY.